United States Patent
Mitchell

(10) Patent No.: US 9,704,299 B2
(45) Date of Patent: *Jul. 11, 2017

(54) INTERACTIVE THREE DIMENSIONAL DISPLAYS ON HANDHELD DEVICES

(71) Applicant: Disney Enterprises, Inc., Burbank, CA (US)

(72) Inventor: Kenny Mitchell, Surrey (GB)

(73) Assignee: Disney Enterprises, Inc., Burbank, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/919,324

(22) Filed: Oct. 21, 2015

(65) Prior Publication Data

US 2016/0042572 A1   Feb. 11, 2016

Related U.S. Application Data

(63) Continuation of application No. 14/076,839, filed on Nov. 11, 2013, now Pat. No. 9,208,618, which is a continuation of application No. 12/756,414, filed on Apr. 8, 2010, now Pat. No. 8,581,905.

(51) Int. Cl.
| | |
|---|---|
| G06T 19/20 | (2011.01) |
| G06T 15/20 | (2011.01) |
| G06F 1/16 | (2006.01) |
| H04N 7/18 | (2006.01) |

(52) U.S. Cl.
CPC ............ *G06T 19/20* (2013.01); *G06F 1/1613* (2013.01); *G06T 15/20* (2013.01); *H04N 7/183* (2013.01); *G06F 2200/1614* (2013.01); *G06F 2200/1637* (2013.01); *G06T 2219/2021* (2013.01)

(58) Field of Classification Search
CPC ................. G06F 2200/1614; G06F 2200/1637
See application file for complete search history.

(56) References Cited

U.S. PATENT DOCUMENTS

| | | | |
|---|---|---|---|
| 8,120,625 B2 | 2/2012 | Hinckley | |
| 8,581,905 B2 | 11/2013 | Mitchell | |
| 2005/0104881 A1 | 5/2005 | Yoshida et al. | |
| 2005/0264558 A1* | 12/2005 | Vesely ............... | G02B 27/2221 345/419 |
| 2005/0264857 A1 | 12/2005 | Vesely et al. | |
| 2006/0074289 A1 | 4/2006 | Adler et al. | |
| 2006/0250392 A1 | 11/2006 | Vesely et al. | |
| 2007/0236485 A1 | 10/2007 | Trepte | |
| 2007/0257885 A1 | 11/2007 | Liberty | |
| 2009/0313584 A1 | 12/2009 | Kerr et al. | |
| 2010/0125816 A1 | 5/2010 | Bezos | |
| 2011/0122158 A1 | 5/2011 | Lee et al. | |
| 2014/0063008 A1 | 3/2014 | Mitchell | |

* cited by examiner

*Primary Examiner* — Daniel Hajnik
(74) *Attorney, Agent, or Firm* — Patterson + Sheridan, LLP

(57) ABSTRACT

Techniques are disclosed for rendering an anamorphic projection of 3D scene geometry on a handled device using a correct asymmetric perspective geometry projection. Once pose of the handheld device is determined, a relative eye position may be inferred when the device is tilted away from an initial or default pose, based on data supplied by accelerometers. Thus, embodiments of the invention result in a holographic style display without the need for glasses or external sensing attachments.

20 Claims, 8 Drawing Sheets

INTERACTIVE THREE DIMENSIONAL DISPLAYS ON HANDHELD DEVICES

CROSS-REFERENCE TO RELATED APPLICATION

This application is a continuation of co-pending U.S. patent application Ser. No. 14/076,839, filed Nov. 11, 2013, which is a continuation of U.S. patent application Ser. No. 12/756,414, filed Apr. 8, 2010, now U.S. Pat. No. 8,581,905. The aforementioned related patent applications are herein incorporated by reference in their entirety.

BACKGROUND

Field of the Invention

The present invention relates to computer graphics and, in particular, to techniques for rendering anamorphic projections of 3D geometry on handheld devices.

Description of the Related Art

Handheld devices, such as mobile phones, have evolved to provide sophisticated computing platforms, complete with large display areas, touch, sensitive surfaces, and cameras, among other components. Further, the computing power of these devices has steadily increased, allowing sophisticated computing applications to be executed from the palm of one's hand. For example, handheld devices now frequently include computing hardware capable of rendering 3D graphics images in real time, and a variety of rendering applications are available for handheld devices. For example, a version of the known OpenGL graphics library—OpenGL ES—provides a subset of the OpenGL 3D graphics API designed for embedded devices such as mobile phones, PDAs, and handheld video game devices.

Recently, handheld devices have been introduced which include tilt sensors (accelerometers). The accelerometers allow applications to sense and respond to changes in spatial orientation as the device is tilted in different axes.

SUMMARY

Embodiments of the invention provide a technique for rendering an anamorphic projection of 3D scene geometry on handled devices. One embodiment of the invention includes a method for rendering a set of three-dimensional (3D) geometry on a display of a handheld device. The method may generally include receiving a set of accelerometer data determined by one or more accelerometers and include determining, based on the accelerometer data, a current pose of the handheld device. In response to changes in the current pose of the handheld device, an anamorphic 3D display of the 3D geometry is then rendered on the display of the handheld device.

Another embodiment of the invention includes a computer-readable storage medium storing instructions that, when executed by a processor, cause a computer system to perform an operation for rendering a set of three-dimensional (3D) geometry on a display of a handheld device. The operation itself may generally include receiving a set of accelerometer data determined by one or more accelerometers and include determining, based on the accelerometer data, a current pose of the handheld device. In response to changes in the current pose of the handheld device, an anamorphic 3D display of the 3D geometry may be rendered on the display of the handheld device.

Still another embodiment of the invention includes a system with a processor; and a memory configured to perform an operation for rendering a set of three-dimensional (3D) geometry on a display of a handheld device. The operation itself may generally include receiving a set of accelerometer data determined by one or more accelerometers and include determining, based on the accelerometer data, a current pose of the handheld device. In response to changes in the current pose of the handheld device, an anamorphic 3D display of the 3D geometry may be rendered on the display of the handheld device.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention provide techniques for rendering an anamorphic projection of 3D scene geometry on a handled device. In particular, embodiments of the invention may be used to render an arbitrary polygonal mesh using a correct asymmetric perspective geometry projection. In one embodiment, a user calibrates a handheld such that a display screen faces the viewer at a direct viewing position. Doing so allows a default eye position to be determined based on a surface normal of the device display. Alternatively, a default position may be assumed, e.g., a 45° degree tilt relative to the ground with the device presumed to be approximately 30 cm away from the eyes of the viewer. Once the orientation or pose of the device is determined, a relative eye position may be inferred when the device is tilted away from the default starting orientation, based on data supplied by accelerometers. And given the relative change in eye position, an anamorphic projection may be computed to distort a display image in order to create the illusion of a real 3D space oriented on the handheld device. Thus, embodiments of the invention result in a holographic style display without the need for glasses or external sensing attachments. Further, as there is no remote head tracking sensor, latency is only dependent on the device's accelerometer sophistication.

Further still, the appearance of the anamorphic projection is computed such that some objects appear in front of (or above) the plane of the image (the display screen) while other objects are rendered to appear behind (or below) behind the image. In addition to recovering an anamorphic projection distortion, the display may be switched between landscape and portrait orientations, using a smooth adjustment to accelerometer sensing of the device's orientation. In addition to using accelerometer data, in a device with a front-facing camera, eye tracking software may be used to determine a relative position of a viewer eye's as the device is tilted in multiple axes, as well as translated in different axes.

Figure 1:
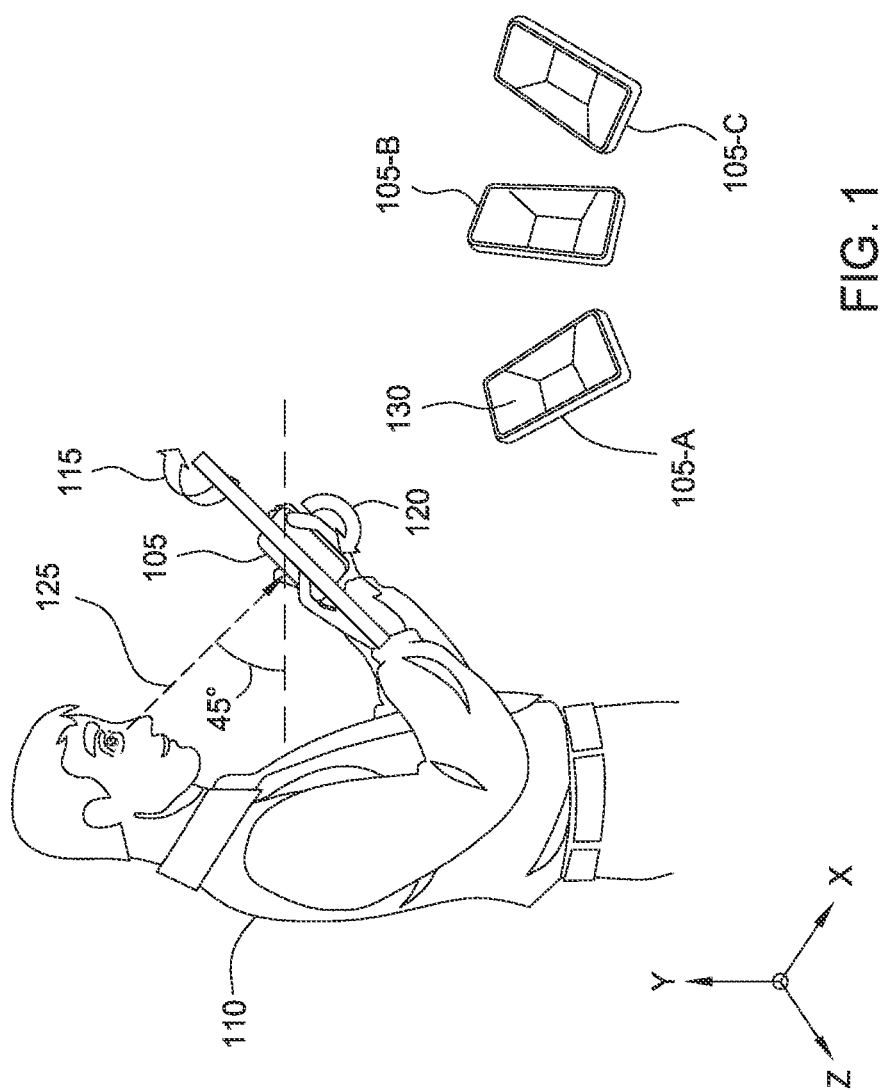
FIG. 1 is a diagram illustrating an example of a user manipulating a handheld device configured to render anamorphic projections of 3D geometry, according to one embodiment of the invention.

FIG. 1 is a diagram 100 illustrating an example of a user 110 manipulating a handheld device 105 configured to render anamorphic projections of 3D geometry, according to one embodiment of the invention. As shown, the user 110 is holding the device 105 at a 45° angle, relative to a horizontal plane, resulting in the user's line of sight being generally co-linear with a surface normal of the device 105 (represented in FIG. 1 using an arrow 125).

Using this as a default orientation, a set of 3D geometry may be rendered on the display of the device 105. In this position, an asymmetric anamorphic projection matrix (described below) does not induce any distortion into the rendered image based on device orientation. However, from this default orientation, the user 110 may tilt the device in different dimensions. For example, the user 110 may tilt the device using a side-to-side motion (roll), represented using an arrow 115, or in a front-to-back motion (pitch), represented by an arrow 120. In such a case, an application rendering a 3D holographic image may use changes in accelerometer data to determine changes to the orientation of the device 110, an inferred eye position relative to the surface normal of the device and to generate the asymmetric anamorphic projection matrix used to distort the 3D rendering. Note, the user 110 could also rotate the device (about arrow 125), but doing so would not change the 45° viewing angle, and thus not require any anamorphic distortion to the display image to retain 3D image fidelity.

FIG. 1 also shows device 105 using three different orientations or poses 105-A, 105-B, and 105-C illustrating how the anamorphic projection may be applied to distort the rendering of a set of 3D geometry. As shown, a rendered image 130 is distorted differently in each of three distinct device poses. However, the particular distortion resulting from the application of the asymmetric anamorphic projection matrix provides a holographic representation of the 3D geometry corresponding to each of the three different orientations 105-A, 105-B, and 105-C. That is, as the user tilts the device 105, the visual appearance of the 3D geometry in rendered image 130 is distorted in a manner to maintain an appearance of a 3D object consistent with both the tilting of the device and the 3D geometry.

System Overview

Figure 2:
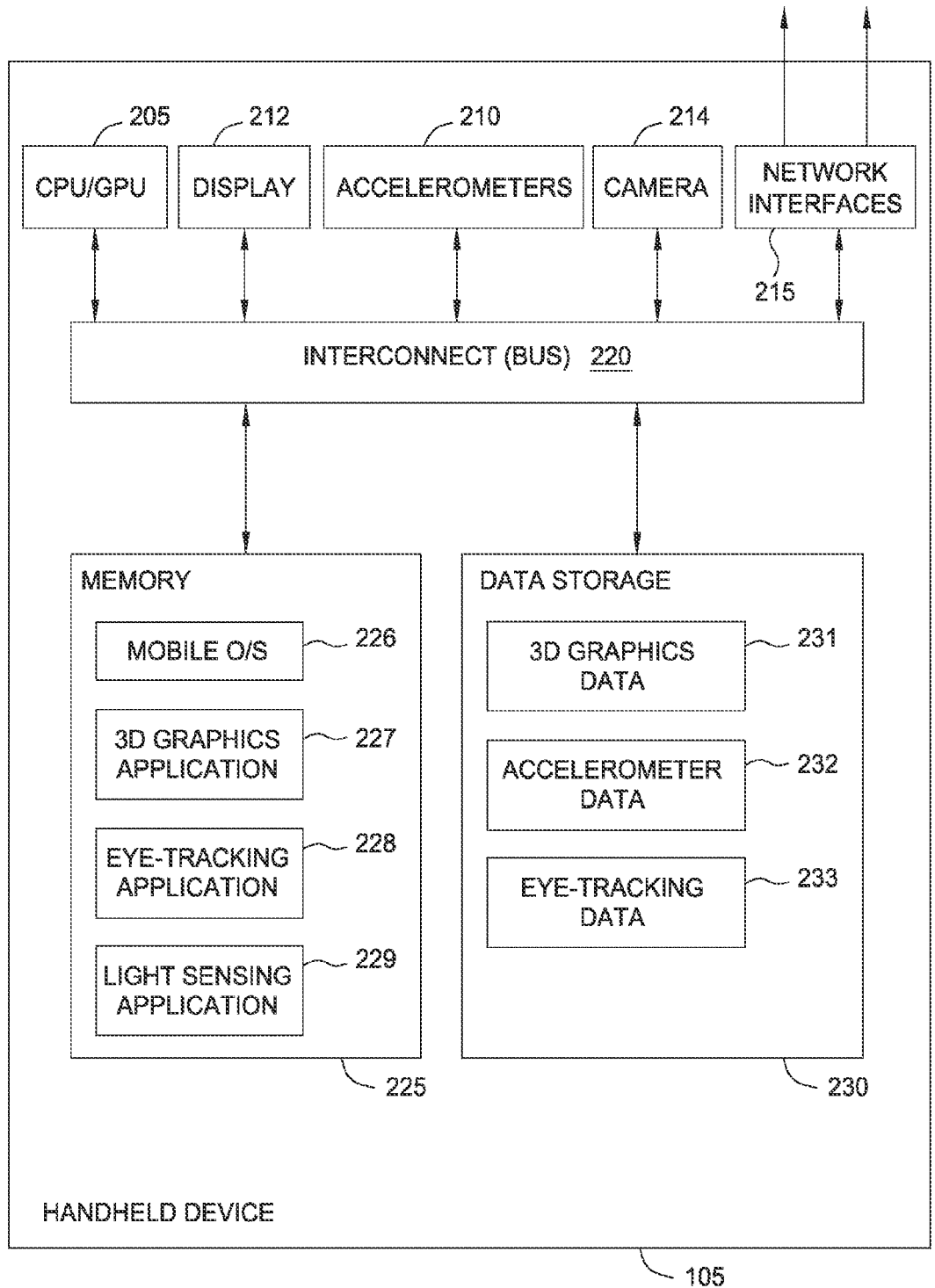
FIG. 2 illustrates an example of a handheld device, according to one embodiment of the invention.

FIG. 2 further illustrates an example of the handheld device 105, according to one embodiment of the invention. In this example, the handheld device 105 is presumed to be handheld telephone with a touch sensitive display 212 and accelerometers 210. Of course, embodiments of the invention may be adapted for use with a variety of computing devices, including PDAs, handheld video game systems, tablet computers, and other computing devices having a display screen and accelerometers.

As shown, the handheld device 105 includes, without limitation, a central processing unit and graphics processing unit (CPU/GPU) 205, network interfaces 215, an interconnect 220, a memory 225, and storage 230. In addition to the touch sensitive display 212 and accelerometers 210, the handheld device 105 may also include a camera 214. Further, the handheld device 105 may include other hardware components used to determine an orientation (or position) of the device (e.g., a magnetometer used to track a compass-facing direction of display 212). Each accelerometer 210 may be configured to measure the acceleration of the handheld device (relative to freefall) in a distinct dimension (e.g., X, Y, and Z dimensions).

The CPU/GPU 205 retrieves and executes programming instructions stored in the memory 225. Similarly, the CPU/GPU 205 stores and retrieves application data residing in the memory 225. The interconnect 220 is used to transmit programming instructions and application data between the CPU/GPU, storage 230, network interfaces 215, and memory 225. CPU/GPU 205 is included to be representative of a single CPU, multiple CPUs, a single CPU having multiple processing cores, and the like. And the memory 225 is generally included to be representative of a random access memory. Storage 230, such as a hard disk drive or flash memory storage drive, may store non-volatile data. Accelerometers 210 provide components that measure proper acceleration of the handheld device 105, i.e., acceleration of the handheld device 105 relative to freefall. In one embodiment, the accelerometers 210 may be configured to detect magnitude and/or direction of the acceleration of the handheld device 105 as a vector quantity at a specified rate, e.g., the accelerometers in some currently available handheld devices operate at rate of 100 Hz. The camera 214 may provide a CCD device configured to capture still-images and video stored in data storage 230.

Illustratively, the memory 225 includes a mobile operating system (O/S) 226, a 3D graphics application 227, an eye-tracking application 228 and a light-level sensing application 229, and the data storage 230 contains a set of 3D graphics data 231, accelerometer data 232, and eye-tracking data 233. The mobile O/S 226 provides software configured to control the execution of application programs on the handheld device.

The 3D graphics application 227 may be configured to generate anamorphic projections of the 3D graphics data 231 on the display 212. In one embodiment, the 3D graphics application 227 may be a stand-alone application. However, the 3D graphics application 227 may also be a component of video-game where tilting of the handheld device 105 is interpreted as user-input for game mechanics. The 3D graphics application 227 could also be a component of the mobile O/S 226. In such a case, the 3D graphics application 227 could render user interface elements of the mobile O/S 226 using the anamorphic projection techniques described herein. Of course, more generally, the 3D graphics application 227 may be a component of a broad variety of application programs with functionality tailored to suit the needs of a particular case.

The eye-tracking application 228 may provide a software application configured to use the camera 214 to track the relative position of the eye's of the viewer and the display screen 212. In one embodiment, 3D graphics application 227 may use the resulting eye-tracking data 233 in conjunction with the accelerometer data 232 in order to create anamorphic display rendered on display 212. As described in greater detail below, the use of eye-tracking data 233 may increase the degrees-of-freedom in which changes in the device orientation may be determined above what may be determined using just the accelerometer data 232.

The light-sensing application 229 may provide a software application configured to use the camera 214 to derive data describing an ambient lighting state. In one embodiment, the ambient lighting may influence the holographic rendering of the 3D graphics data 231. For example, elements of 3D geometry may be rendered on display 212 based, in part, by recovering an approximate light probe from the color RGB intensity values recorded by the camera 214. Doing so may allow a correct lighting response to be applied to the surfaces of the 3D graphics data 231, further improving the appearance of a physical object on and inside the handheld device 105.

It will be appreciated that the handheld device 105 shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 3:
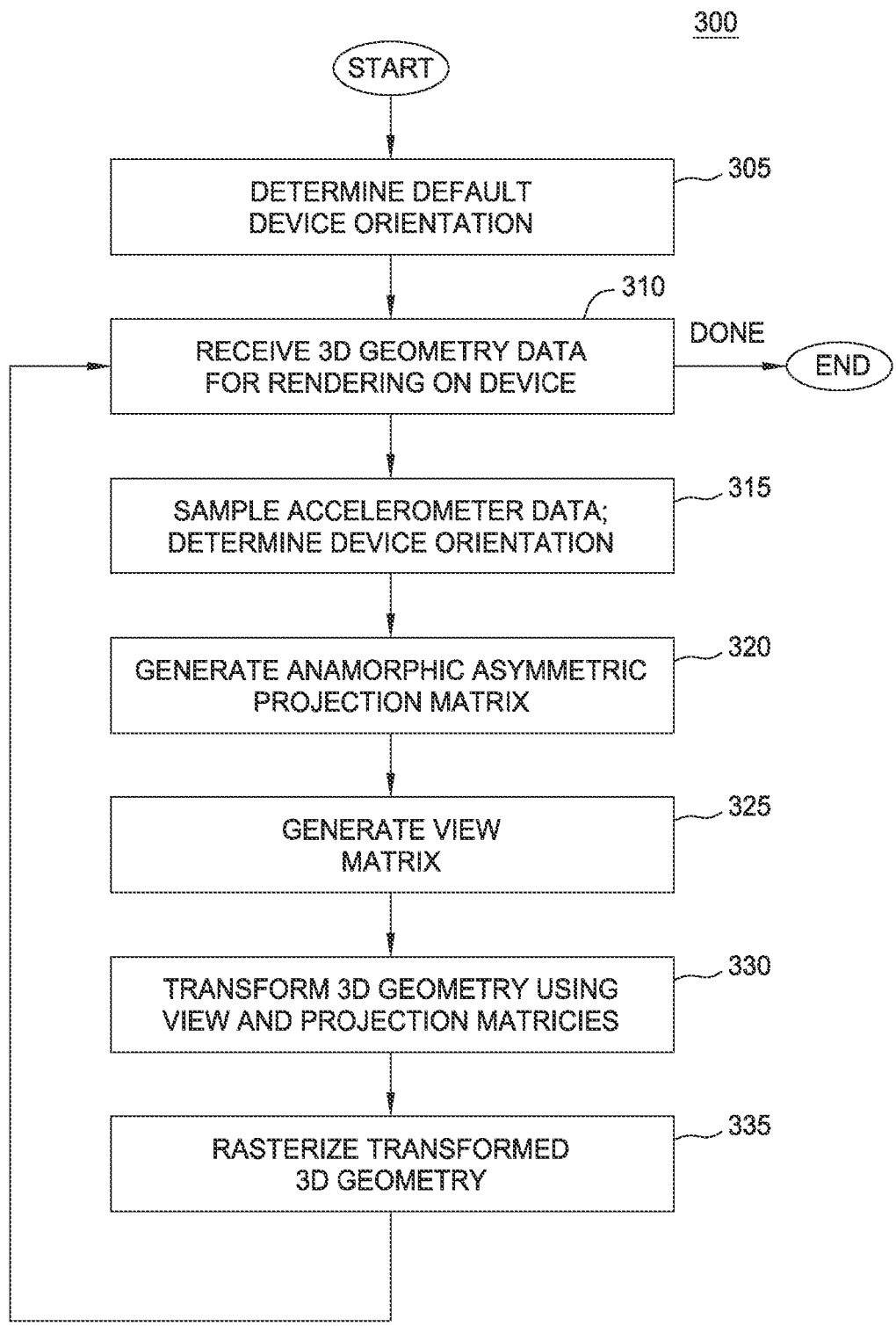
FIG. 3 illustrates a method for rendering anamorphic projections of 3D geometry on a handheld device, according to one embodiment of the invention.

FIG. 3 illustrates a method 300 for rendering anamorphic projections of 3D geometry on a handheld device, according to one embodiment of the invention. Although described in conjunction with the handheld device of FIGS. 1 and 2, persons skilled in the art will understand that any system configured to perform the steps of method 300, in any order, is within the scope of the present invention.

As shown, the method 300 begins at step 305, where a 3D graphics application determines a default pose of the handheld device. For example, as noted above, a user may calibrate a handheld device such that in a default pose, a display screen faces the viewer at a desired viewing position and angle. Alternatively, a default pose may be assumed, e.g., a 45° degree tilt relative to the ground with the device presumed to be approximately 30 cm away from the eyes of the viewer. While it is possible to calibrate the handheld device using any default 3D orientation and to perform anamorphic projection relative to this default, gravitational acceleration affects the accelerometers inconsistently, depending on the orientation of the handheld device. And using 45° degrees as a default orientation has proven to be an effective default with respect to both the accuracy of the accelerometer data and with respect to providing a comfortable viewing position.

Additionally, the default pose may be determined with the device in either a portrait or a landscape depending, e.g., on user preference and the particular application being executed on the handheld device. Further, in one embodiment, the 3D graphics application may detect the tilt between a major upright axis and known gravity vector to determine whether to switch between a portrait and landscape mode (or vice versa). As the 3D graphics application is also dependent on the relative tilt measurements, a normal threshold for switching between a landscape and portrait rendering may be extended to avoid switching between these modes when not intended. Further, for both the portrait and landscape modes, an alternative set of projection mappings is applied to account for the different accelerometer axes of rotation relative to the upright pose of the viewer—essentially, the measurements representing the horizontal and vertical axes are swapped with one another, depending on whether a landscape mode or a portrait mode is being used. For example, FIGS. 7A-7B illustrate examples of a handheld device in different orientations. In particular, FIG. 7A illustrates a handheld device 705 in a portrait orientation, along with the general directions of the X, Y, and Z axes. And FIG. 7B illustrates a handheld device 710 in a landscape orientation, along with the general directions of the X, Y, and Z axes. Note, the X and Y axes are switched with one another in FIGS. 7A and 7B to swap the horizontal and vertical axes when the handheld device is changed from one orientation to another.

Referring again to the method 300 of FIG. 3, at step 310, the 3D graphics application may receive a set of 3D geometry data for rendering on a screen display of the handheld device. As is known, the 3D graphics data may be represented as a set of object vertices defining a polygonal tessellation of an object to be rendered. Once received, the 3D geometry may be used to render an image shown on the display screen of the handheld device.

At step 315, the 3D graphics application may sample accelerometer data to determine a current pose of the device. For example, assume the accelerometers update at a maximum rate of 100 Hz with low latency. Such a signal may be expected to be somewhat noisy as well as sensitive to shaky hands. In one embodiment, the accelerometer data may be filtered or smoothed to counter this noise and to yield a more stable orientation vector. For example, the 3D graphics application may interpolate between a current value and a fraction of the previous value, i.e., essentially applying a low-pass filter with an exponentially weighted moving average. This may be represented mathematically as follows:

$$A_{smoothed} = \alpha A_t + (1-\alpha) A_{t-1}$$

where $\alpha$ is the filtering factor and A is the accelerometer sensed value with each axis, giving an $A^x$, $A^y$, and $A^z$, corresponding to a linear sensed value in each of the X, Y, and Z dimensions. In one embodiment, the smoothed $A^x$, $A^y$, and $A^z$ are used to derive an orientation vector, providing a then current surface normal vector to the display screen of the handheld device.

One of ordinary skill in the art will recognize that in gaining pose or orientation stability, such filtering may increase latency in response to orientation changes. This is unlikely to cause problems with an application refresh rate of 100 Hz and render rate of 60 Hz, but could lead to performance issues at lower render rates. In such cases, the approach for filtering the accelerometer data (or whether to filter it at all) may be determined as appropriate for the needs of a particular case. Additionally, other approaches for smoothing the accelerometer data include using a Kalman filter, using an alpha/beta/gamma filtering approach, or using a Taylor series, etc At step 320, the 3D graphics application may generate an asymmetric anamorphic projection matrix used to distort a rendering of 3D image data based on the current orientation vector of the handheld device determined from the smoothed accelerometer data. The asymmetric anamorphic projection matrix distorts the 3D images rendered on the display device to account for the relative tilting of the handheld device away from the default orientation. In one embodiment, the anamorphic projection matrix may be computed as follows:

$$\begin{bmatrix} \frac{2near}{right-left} & 0 & A & 0 \\ 0 & \frac{2near}{right-left} & B & 0 \\ 0 & 0 & C & D \\ 0 & 0 & -1 & 0 \end{bmatrix}$$

where $$A = \frac{right+left}{right-left} \quad B = \frac{top+bottom}{top-bottom}$$

$$C = \frac{far+near}{far-near} \quad D = \frac{2(far)(near)}{far-near}$$

Figure 4:
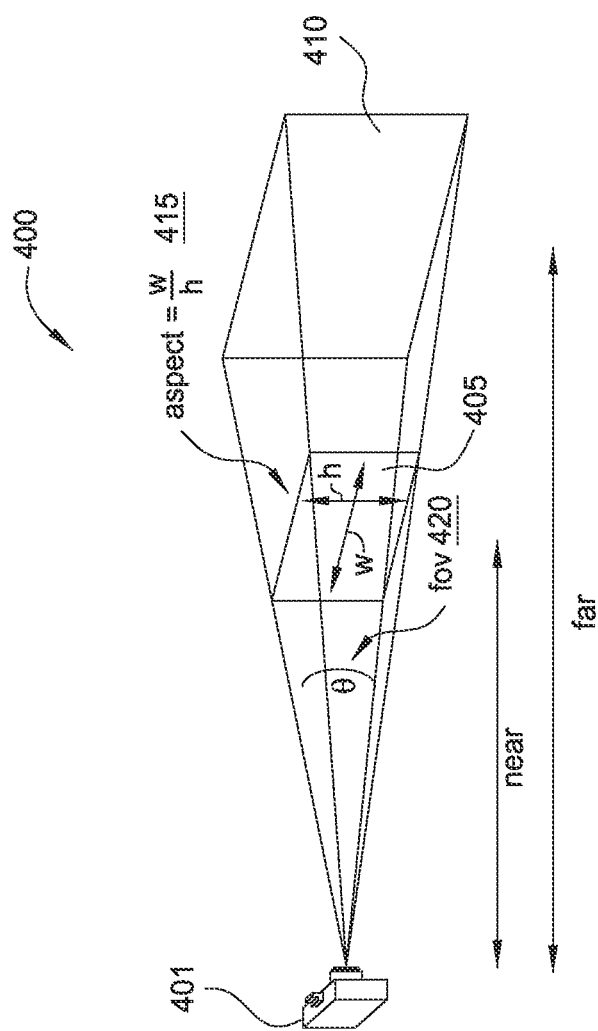
FIG. 4 illustrates an example of a view frustum, according to one embodiment of the invention.

The left, right, top and bottom rectangle values define the aspect and dimensions of the view plane associated with the field of view and the near and far values correspond to a distance from a near and far plane of a view frustum (determined relative to a current orientation vector of the device). These values are further illustrated in FIGS. 4-6 and a derivation of these values is described below. Specifically, FIG. 4 provides a reference example of a view frustum 400. The frustum 400 models a region of space in the 3D geometry that may appear on a display screen. More simply, the frustum bounds a field of view of the camera 401. A near plane 405 and a far plane 41 cut the frustum perpendicular to the viewing direction. Objects closer to the camera 401 than the near plane 405 or beyond the far plane 410 are not drawn. Additionally, the angle defines the field of view (fov) and an aspect 415 may be determined as the ratio (w/h) of width (w) to height (h) of a plane perpendicular to the viewing direction. The values for w, h, fov, aspect, and viewscale may be represented mathematically as follows:

$$W = right-left, \quad h = top-bottom, \quad fov = 2\arctan\left(\frac{w}{2 \text{ distance}}\right)$$

$$aspect = \frac{w}{h}, \quad viewscale = \tan\left(\frac{fov}{2}\right)$$

Figure 5:
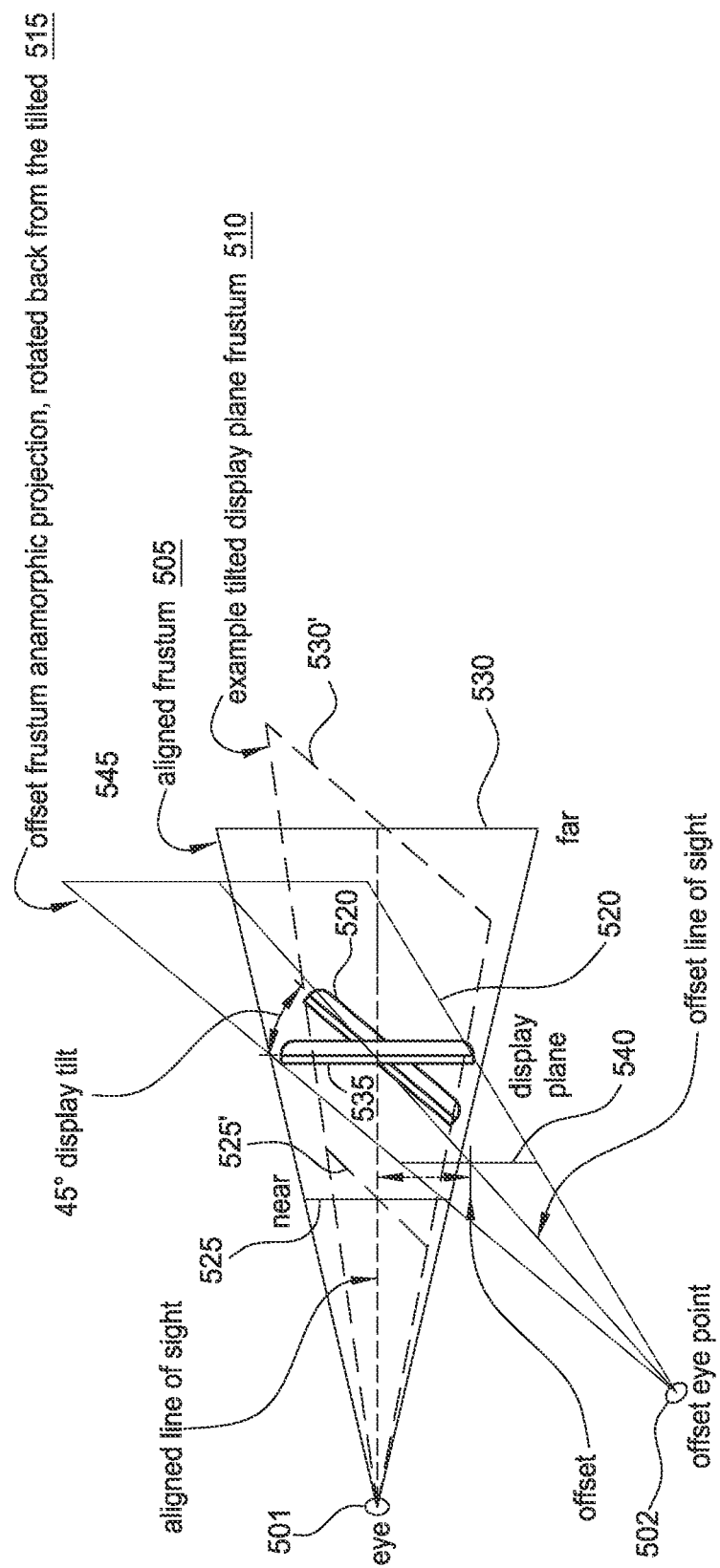
FIG. 5 illustrates an example of a view frustum aligned to generate an anamorphic 3D display, according to one embodiment of the invention.

FIG. 5 illustrates an example of a symmetric aligned view frustum 505 to generate an anamorphic 3D display based on device orientation, according to one embodiment of the invention. The aligned symmetric view frustum 505 occurs when directly facing the display along the aligned line of sight—that is when the handheld is viewed from the default orientation. The aligned view frustum 505 is shown top-down with an eye position at 501, a near clipping plane 525, and a far clipping plane 530. Additionally, a display plane 535 is located between the near and far clipping planes 525, 530. The display plane 520 corresponds to the screen of the handheld device 520. Initially, the display plane 530 is parallel to the near and far clipping planes 525, 530. When a user tilts the display the frustum becomes skewed, shown in FIG. 5 using skewed frustum 510. In this example, the handheld device 520 is tilted 45° degrees in the vertical dimension (i.e., form the user's perspective, the handheld device 520 is tilted to the left 45° degrees). This results in the tilted frustum 510 (shown in FIG. 5 using a dashed line). The tilted handheld device 520' results in a frustum where the left side is further away and the right side being foreshortened. The effect on the near and far clipping planes 525, 530 is shown in a titled near clipping plane 525', and a tilted far clipping plane 530'. Importantly, the near, far and display plane distances remain unchanged.

For rendering this frustum, asymmetric frustum skewing is performed using the A, B, C, and D offsets in the perspective projection matrix set forth above. The offsets are an amount by which the near plane is displaced under the new offset eye point 502.

In addition to the aligned view frustum 505, and the tilted frustum 510, FIG. 5 shows an offset frustum 515 rotated back from the tilted frustum. As shown, the eye point 502 of the offset frustum 515 is positioned such that a near clipping plane 540 and far clipping plane 545 are parallel with the view plane.

This permits a perspective image projection offset from the axis of the normal to the view plane to be determined. The left, right, top and bottom rectangle values define the aspect and dimensions of the view plane associated with the field of view. Assuming a regular distance from the eye to the device is approximately 30 cm, an accurate field of view can be calculated appropriate to the physical size of the device's display area. This adjustment allows the correct foreshortening of perspective falloff to be represented in the image for physically accurate dimensions of objects above and below the surface of the device.

In one embodiment, graphics API calls (e.g., OpenGL ES calls) are used to transform vertices in the perspective projection to a unit cube with the depth, z-coordinate range of [−1, 1]. Primitives falling outside this range are clipped. They correspond to the mapping of near and far distance values for the tilted display plane frustum. In this viewing system, to have objects appear virtually in front of the display's image plane, a near clip distance is specified to be less than 1 and greater than 0. In one embodiment, a near clip plane distance of 0.5 is used to balance the accuracy of mapped depth values to z-buffer accuracy and the amount of distortion for objects extending only a small distance in front of the display.

Returning to the method 300 of FIG. 3, at step 325, the 3D graphics application generates a view matrix. The view matrix generally corresponds to a transformation applied to world space geometry coordinates to generate a location and orientation relative to the offset eye position in view space. The offset projection rectangle values (left, right, top, and bottom) used in the perspective projection matrix may be derived as direct scale and bias calculations on the device's orientation vector. These are equally complimented by the offset camera view matrix' eye position to account for the offset viewing direction. In one embodiment, the view matrix calculation may be formulated as follows:

$$\begin{bmatrix} lat_x & lat_y & lat_z & 0 \\ up_x & up_y & up_z & 0 \\ dir_x & dir_y & dir_z & 0 \\ eye_x & eye_y & eye_z & 1 \end{bmatrix}$$

where $dir = |at - eye| \times up$ $lat = |dir \times up|$

Figure 6:
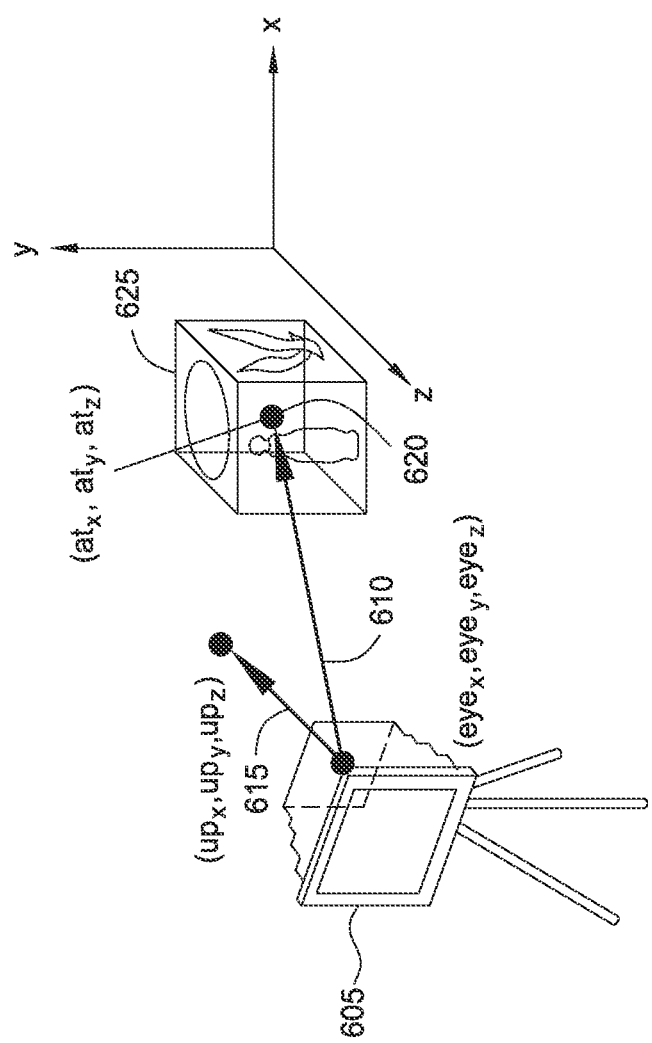
FIG. 6 illustrates a graphical representation of the vectors used to generate a view matrix, according to one embodiment of the invention.

That is, where a direction vector corresponding to the offset viewing direction along the line of sight is computed as the cross product of the |lat−eye| vector and the up vector, and the lateral vector (lat) is computed as the cross product of the dir and up vectors. FIG. 6 illustrates a graphical representation of the at, up, and eye vectors. As shown, a camera 605 is used to define an eye vector 610 and an up vector 615 and a point (at) 620 in a clip space 625.

In one embodiment, the perspective matrix (generated at step 320 of method 300) and view matrix (generated at step 325 of method 300) may be generated using the library the glFrustum and gluLookAt API calls provided by the OpenGL ES graphics library. Of course, these matrixes may be created using other graphics libraries or constructed explicitly by the 3D graphics application. For example, values in the perspective matrix set forth above may be generated using the following parameters for the glFrustum API call:

$$\text{left} = -\text{viewscale} - x_{\mathit{offset}}$$

$$\text{right} = \text{viewscale} - x_{\mathit{offset}}$$

$$\text{top} = -\left(\frac{\text{viewscale}}{\text{aspect}}\right) - y_{\mathit{offset}}$$

$$\text{bottom} = \left(\frac{\text{viewscale}}{\text{aspect}}\right) - y_{\mathit{offset}}$$

$$\text{near} = 0.5 \; \text{far} = 8.0$$

where $$x_{\mathit{offset}} = x_{\mathit{bias}} - A^x_{\mathit{smoothedXscale}}$$

$$y_{\mathit{offset}} = y_{\mathit{bias}} - A^y_{\mathit{smoothedYscale}}$$

The $X_{\mathit{offset}}$ and $Y_{\mathit{offset}}$ represent the changes in relative offset view frustum location in the perspective matrix and complimentary offset eye position in the view matrix. Values for viewscale and aspect are defined according to the physical dimensions and aspect of the device's display panel. Note, the values of scale, bias, and accelerometer axis readings are selected according to the determined default orientation vector and device aspect (portrait/landscape). For example, holding a 320×480 resolution display panel in the regular 45° portrait aspect would select $X_{\mathit{bias}}=0$, $X_{\mathit{scale}}=\frac{2}{3}$, $Y_{\mathit{bias}}=\frac{1}{2}$, $Y_{\mathit{scale}}=1$, permitting the $X_{\mathit{offset}}$ to be adjusted at a rate relative to the ⅔ width of the display and the $Y_{\mathit{offset}}$ to be applied relative to the default 45° orientation. Values in the view matrix set forth above may be generated using the following parameters for the gluLookAt API call:

eye'$_x$, eye'$_y$, eye$_z$, at'$_x$, at'$_y$, at$_z$, up$_x$, up$_y$, up$_z$ where eye'$_x$=2x$_{\mathit{offset}}$, eye'$_y$=2y$_{\mathit{offset}}$, at'$_x$=2x$_{\mathit{offset}}$, at'$_y$=2y$_{\mathit{offset}}$ This yields a projected image whose view plane is fixed and stable accurately fitting the dimensions of the display at a clip z-distance of 0. Further, geometry projected to a negative clip distance has a negative parallax effect resulting from device tilting movements and appear in front of the surface, and geometry projected to a positive clip distance has a positive parallax effect and appears behind the surface of the handheld device.

Returning to the method 300 of FIG. 3, at step 330, the 3D geometry is transformed using the product of the perspective matrix (generated at step 320 of method 300) and view matrix (generated at step 325 of method 300). And at step 335, the 3D graphics application may rasterize the transformed 3D geometry, resulting in a set of pixel values to display on the screen of the handheld device. Thereafter, the method 300 returns to step 310 to generate the next frame to display on the device. That is, the 3D application essentially loops through steps 310 to 335 of method 300 at the frame rate provided by the handheld device (e.g., 60 Hz).

The method uses an assumed default eye position viewing directly at the display at an expected distance, and in practice has proven to generate good inferred results. However, as noted above, additional hardware sensors may increase the degrees-of-freedom in which changes in the device orientation may be determined. For example, given a camera sensor with eye tracking image processing software, the 3D graphics application may be configured to determine the eye position relative to the display explicitly. Doing so eliminates the assumptions of distance and relative viewing angle, allowing the 3D Graphics application to more accurately calculate the correct view and perspective matrix transformations than using only the accelerometer data.

Figure 7C:
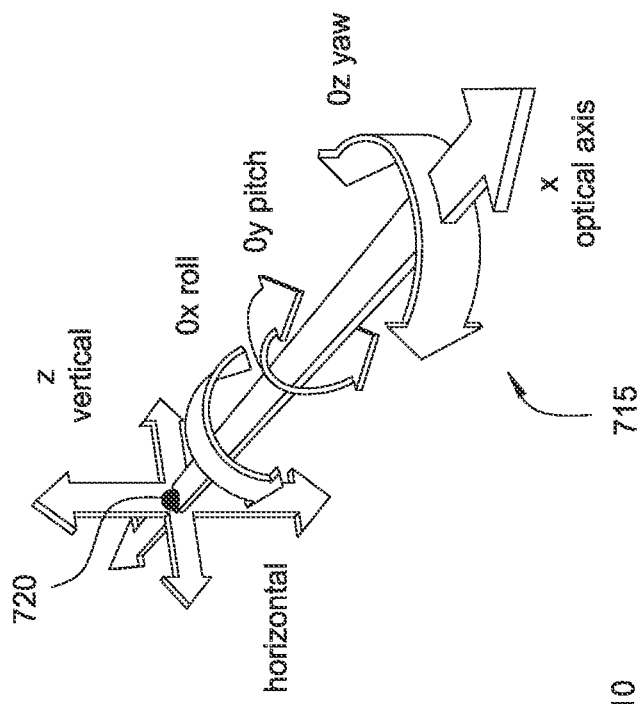
FIG. 7C illustrates an example of the degrees-of-freedom of a handheld device, according to one embodiment of the invention.
Figure 7B:
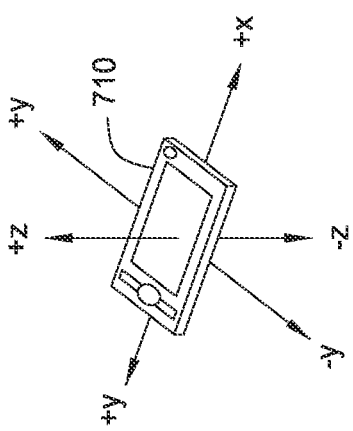
FIGS. 7A-7B illustrate examples of a handheld device in different orientations, according to one embodiment of the invention.
Figure 7A:
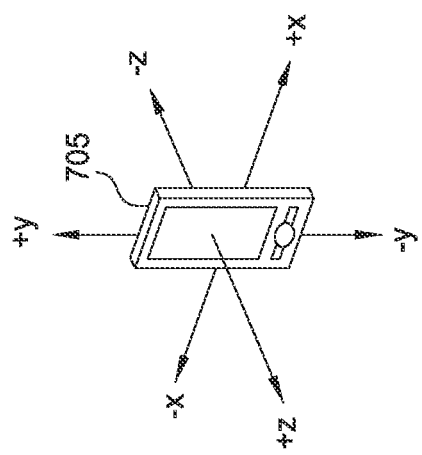

For example, FIG. 7C illustrates the increased number of degrees of freedom handled by a system using a camera. As shown, a graph 715 with a handheld device at the origin 720 may be manipulated using pitch, yaw, and roll movements, as well as translational movements in each of the X, Y, and Z dimensions. The eye tracking software allows the 3D graphics application to determine position and orientation of the handheld device. This may improve the effect as using the accelerometers alone is less effective when a user translates the device's position away from the default line of sight (that is moves the device using something other than a tilting motion).

In a monocular case, the calculations of the perspective and view matrices are generally unchanged from above. However, with a stereoscopic display method (anaglyph, polarized glasses or a lenticular display screen) both eye points may be tracked with accurate positioning. This simply augments the existing offsets by the distance of separation between each perpendicular to the offset view direction. With an accurate distance tracked, the inward orientation of eye gaze on close up objects may also be accounted for and scaled appropriately with distance. Of course, one of ordinary skill in the art will recognize that this camera image processing may result in greater latency for image exposure and data transfer/processing before information an updated anamorphic viewpoint than experienced when using accelerometer sensing. To address this issue, in one embodiment a hybrid approach may be sued. For example, assume a system having a frame refresh rate of 30 Hz with >100 ms latency. In such a case, the handheld device could be configured to combine accurate, eye-position updates (camera) at a low frequency with inferred position updates (accelerometers) at high frequency.

Figure 8A:
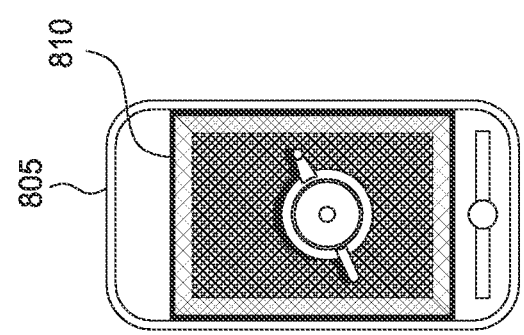
FIGS. 8A-8C illustrate examples of a second projection based on a distortion of the display screen, according to one embodiment of the invention.
Figure 8B:
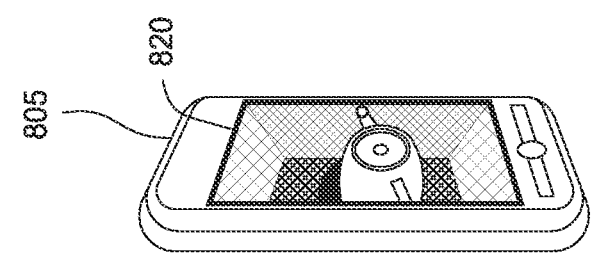
Figure 8C:
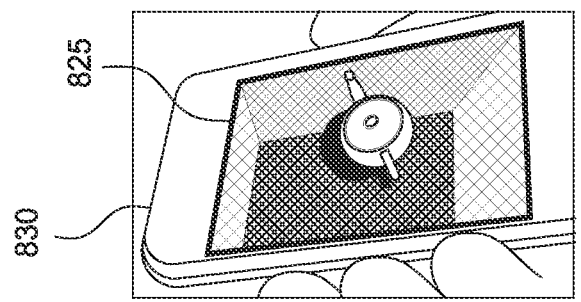

Further, in one embodiment, the 3D graphics application may be configured to account for falloff on the display area of the handheld device when it is tilted in the vertical or horizontal axes. As noted above, the offset projection matrix results in an offset view plane parallel to a near and far clipping plane of the offset frustum used for rendering (e.g., offset frustum 515 shown in FIG. 5). However, as the user has tilted the device, the actual display area becomes distorted. That is, while offset asymmetric perspective projection matrix accounts for the correct viewing location it does not account for perspective falloff of the display's rectangular area. This area becomes a trapezoid when tilted on one axis and a 4-sided polygon with further tilt axes. This effect is shown in FIGS. 8A-8C, which illustrate examples of a display screen on a handheld device. For example, FIG. 8A illustrates a handheld device 805 viewed straight-on. In such a case, the display area is bounded by a rectangle 810. However, FIG. 8B shows the result of tilting the device 805 in the vertical axis. As shown, a display area is transformed into a trapezoidal shape 820. Similarly, FIG. 8C shows a handheld device 825 after being tilted in both directions, resulting in a polygonal display area 830.

In one embodiment, to correct for this additional foreshortening effect, an image warp may be applied to each rendering pass with the offset rendered projection matrix. In such a case, a texture projection matrix hardware transform can be applied, provided there is correct support for a perspective divide in the rendering stage necessary for foreshortening. If this is not available, the image may be tessellated, allowing the wrap to be performed with regular texture interpolation. As still another alternative, a modified offset projection matrix may be derived to include an off-axis transform.

In addition to using accelerometer data, in a device with a front-facing camera, eye tracking software may be used to determine a relative position of a viewer eye's as the device is tilted in multiple axes, as well as translated in different axes. In such a case, the front-facing camera could also be used to determine a light probe, allowing real-world lighting conditions to be reflected in the rendering of 3D geometry on the handheld device. Similarly, a back-facing camera could be used to create a semi-transparent display for use of the method described herein for an rendering an anamorphic projection of 3D scene geometry in an augmented reality application. For example, the techniques described herein could be used to overlay virtual 3D objects against visible or camera captured real world objects.

In sum, embodiments of the invention provide techniques for rendering an anamorphic projection of 3D scene geometry on a handled device using a correct asymmetric perspective geometry projection. Once the default orientation of the handheld device is determined, a relative eye position may be inferred when the device is tilted away from this starting orientation, based on data supplied by accelerometers. Thus, embodiments of the invention result in a holographic style display without the need for glasses or external sensing attachments. Further, as there is no remote head tracking sensor, latency is only dependent on the device's accelerometer sophistication. The appearance of the anamorphic projection is computed such that some objects appear in front of (or above) the plane of the image (the display screen) while other objects are rendered to appear behind (or below) behind the image. In addition to recovering an anamorphic projection distortion, the display may be switched between landscape and portrait orientations, using a smooth adjustment to accelerometer sensing of the device's orientation.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for rendering a set of three-dimensional (3D) geometry on a display of a handheld device, the computer-implemented method comprising:
   determining, based on accelerometer data, a current pose of the display of the handheld device;
   determining, based on the current pose of the display of the handheld device, a current position of a plane within the 3D geometry; and
   in response to the current position of the plane within the 3D geometry, rendering an anamorphic 3D image of the 3D geometry on the display of the handheld device, wherein the anamorphic 3D image presents a holographic style image on the display of the handheld device, wherein the holographic style image creates an illusion of at least a first portion of the 3D geometry appearing in 3D space either above or in front of the plane by distorting the first portion of the 3D geometry using an anamorphic projection.

2. The computer-implemented method of claim 1, wherein the holographic style image further creates an illusion of at least a second portion of the 3D geometry appearing in 3D space either below or behind the plane by distorting the second portion of the 3D geometry using the anamorphic projection.

3. The computer-implemented method of claim 1, further comprising, determining a lighting response to apply in rendering the 3D geometry on the display of the handheld device.

4. The computer-implemented method of claim 1, wherein the anamorphic 3D image presents the holographic style image on the display of the handheld device relative to a default eye position viewing the display of the handheld device at an expected viewing distance.

5. The computer-implemented method of claim 1, further comprising:
   capturing an image of a scene using a camera, wherein the display of the handheld device presents the image of the scene, wherein at least a first element of the 3D geometry is generated from the captured image.

6. The computer-implemented method of claim 1, wherein the anamorphic 3D image presents the holographic style image when viewed from a relative eye position corresponding to the current pose determined based on the accelerometer data, wherein rendering the anamorphic 3D display of the 3D geometry on the display of the handheld device comprises:
   generating an asymmetric anamorphic projection matrix used to distort the rendering;
   generating a view matrix used to account for an offset viewing direction; and
   transforming, including distorting, the 3D geometry using the asymmetric anamorphic projection matrix and the view matrix.

7. The computer-implemented method of claim 6, further comprising:
   determining, based on a current ambient lighting state, a lighting response to apply in rendering the 3D geometry on the display of the handheld device;
   determining a lighting response to apply in rendering the 3D geometry on the display screen of the handheld device, wherein the lighting response is determined based on the current ambient lighting state;

wherein the anamorphic 3D image presents the holographic style image when viewed from a relative eye position corresponding to the current pose determined based on the accelerometer data, lighted based on the current ambient lighting state.

8. The computer-implemented method of claim 7, wherein the holographic style image further creates an illusion of at least a second portion of the 3D geometry appearing in 3D space either below or behind the plane by distorting the second portion of the 3D geometry using the anamorphic projection;

capturing an image of a scene using a first camera, wherein the display screen presents the image of the scene and wherein at least a first element of the 3D geometry is generated from the captured image; and overlying one or more virtual 3D objects over at least a portion of the first element of the 3D geometry generated from the captured image.

9. The computer-implemented method of claim 8, further comprising:

filtering the accelerometer data using a low-pass filter, wherein each of the one or more accelerometers measure acceleration of the handheld device relative to freefall in a distinct dimension;

determining a distortion present in the display based on the current pose;

generating an image warp to transform the rendering of the anamorphic 3D display of the 3D geometry to correct a foreshortening effect resulting from the distortion;

tracking an eye position of a viewer using a second camera, wherein the current pose and a position of the handheld device are determined based on the tracked eye position; and determining whether the default pose of the handheld device is being viewed in one of a portrait viewing mode and a landscape viewing mode.

10. The computer-implemented method of claim 9, wherein the asymmetric anamorphic projection matrix distorts the rendered anamorphic 3D display to account for a relative tilting of the handheld device away from a default pose;

wherein the view matrix generally provides a transformation applied to world space geometry coordinates of 3D geometry to generate a location and orientation relative to an offset eye position in view space;

wherein the lighting response applies the current ambient lighting state in rendering the 3D geometry, wherein the computer-implemented method further comprises:

recovering an approximate light probe from red, green, and blue (RGB) intensity values recorded by the image, wherein the lighting state is determined from the approximate light probe.

11. A non-transitory computer readable medium storing instructions, which, which executed on a processor, perform an operation for rendering a set of three-dimensional (3D) geometry on a display of a handheld device, the operation comprising:

determining, based on accelerometer data, a current pose of the display of the handheld device;

determining, based on the current pose of the display of the handheld device, a current position of a plane within the 3D geometry; and in response to the current position of the plane within the 3D geometry, rendering an anamorphic 3D image of the 3D geometry on the display of the handheld device, wherein the anamorphic 3D image presents a holographic style image on the display of the handheld device, wherein the holographic style image creates an illusion of at least a first portion of the 3D geometry appearing in 3D space either above or in front of the plane by distorting the first portion of the 3D geometry using an anamorphic projection.

12. The non-transitory computer readable medium of claim 11, wherein the holographic style image further creates an illusion of at least a second portion of the 3D geometry appearing in 3D space either below or behind the plane by distorting the second portion of the 3D geometry using the anamorphic projection.

13. The non-transitory computer readable medium of claim 11, wherein the operation further comprises, determining a lighting response to apply in rendering the 3D geometry on the display of the handheld device.

14. The non-transitory computer readable medium of claim 11, wherein the anamorphic 3D image presents the holographic style image on the display of the handheld device relative to a default eye position viewing the display of the handheld device at an expected viewing distance.

15. The non-transitory computer readable medium of claim 11, wherein the operation further comprises:

capturing an image of a scene using a camera, wherein the display of the handheld device presents the image of the scene, wherein at least a first element of the 3D geometry is generated from the captured image.

16. A system to render a set of three-dimensional (3D) geometry on a display of a handheld device, the system comprising:

a processor; and a memory storing instructions, which, which executed on the processor, perform an operation comprising:

determining, based on accelerometer data, a current pose of the display of the handheld device, determining, based on the current pose of the display of the handheld device, a current position of a plane within the 3D geometry, and in response to the current position of the plane within the 3D geometry, rendering an anamorphic 3D image of the 3D geometry on the display of the handheld device, wherein the anamorphic 3D image presents a holographic style image on the display of the handheld device, wherein the holographic style image creates an illusion of at least a first portion of the 3D geometry appearing in 3D space either above or in front of the plane by distorting the first portion of the 3D geometry using an anamorphic projection.

17. The system of claim 16, wherein the holographic style image further creates an illusion of at least a second portion of the 3D geometry appearing in 3D space either below or behind the plane by distorting the second portion of the 3D geometry using the anamorphic projection.

18. The system of claim 16, wherein the operation further comprises, determining a lighting response to apply in rendering the 3D geometry on the display of the handheld device.

19. The system of claim 16, wherein the anamorphic 3D image presents the holographic style image on the display of the handheld device relative to a default eye position viewing the display of the handheld device at an expected viewing distance.

20. The system of claim 16, wherein the operation further comprises:

capturing an image of a scene using a camera, wherein the display of the handheld device presents the image of the scene, wherein at least a first element of the 3D geometry; and overlying one or more virtual 3D objects over at least a portion of the first element of the 3D geometry generated from the captured image.

\* \* \* \* \*

UNITED STATES PATENT AND TRADEMARK OFFICE
CERTIFICATE OF CORRECTION

PATENT NO. : 9,704,299 B2
APPLICATION NO. : 14/919324
DATED : July 11, 2017
INVENTOR(S) : Kenny Mitchell It is certified that error appears in the above-identified patent and that said Letters Patent is hereby corrected as shown below:

In the Specification

In Column 6, Line 62, after "etc" insert --.--.

In the Claims

In Column 13, Line 57, in Claim 11, delete "which, which" and insert --which, when--.

In Column 14, Line 35, in Claim 16, delete "which, which" and insert --which, when--.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*